March 2, 1937. C. MILLER ET AL Re. 20,280

METHOD OF MAKING SHOES

Original Filed June 13, 1931 3 Sheets-Sheet 1

INVENTOR
CHARLES MILLER
ALBERT LEONE
BY Carl W. Cohen
ATTORNEY

March 2, 1937. C. MILLER ET AL Re. 20,280

METHOD OF MAKING SHOES

Original Filed June 13, 1931 3 Sheets-Sheet 2

INVENTORS
CHARLES MILLER
ALBERT LEONE
BY Carew & Cohen
ATTORNEY

March 2, 1937. C. MILLER ET AL Re. 20,280

METHOD OF MAKING SHOES

Original Filed June 13, 1931 3 Sheets-Sheet 3

INVENTORS
CHARLES MILLER
ALBERT LEONE
BY Carl W. Cohen
ATTORNEY

Reissued Mar. 2, 1937

Re. 20,280

UNITED STATES PATENT OFFICE 20,280

METHOD OF MAKING SHOES

Charles Miller and Albert Leone, Long Island City, N. Y.; said Leone assignor to I. Miller & Sons, Incorporated, a corporation of New York Original No. 1,878,876, dated September 20, 1932, Serial No. 544,118, June 13, 1931. Application for reissue April 9, 1934, Serial No. 719,813

6 Claims. (Cl. 12—142)

This invention relates to the shoe art and deals more specifically with a turned shoe and the process of making the same.

In accordance with the prior art practice of making turned shoes, the complete upper is assembled as a unit and sewed to the outsole, the upper being turned inside out. Following this operation, the last is withdrawn and the shoe is turned rightside out.

In manufacturing ladies' shoes, slippers and sandals of the open shank type, the trouble and expense of following the prior art practice has made it desirable to develop a new method of making these last mentioned products, which method still retains the desirable features of the turned process.

Briefly, the present invention is realized by preparing, on separate lasts, the upper in two separate sections, a forward section and a rear section, and later joining the two sections together to form the finished shoe.

The manner in which the present invention is carried out will be more fully understood from the following description taken in connection with the accompanying drawings, in which.

Figs. 4 to 8 inclusive are detail views.

Referring in detail to the drawings, the sandal is seen to comprise a forward section 10 and rear section 11, the two sections being adapted to be fitted together to form the complete shoe.

Figure 4:
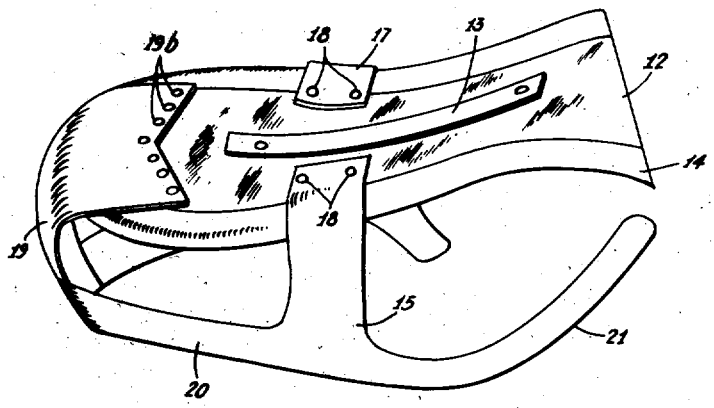

Referring more particularly to Fig. 4, the method of producing the rear section 11 will be described in detail. A shank piece 12, such as is commonly used in the turn process, having a steel shank stiffener 13, is provided with a binding tape 14, which is cemented around the marginal edge of the piece 12 in order to present at the edges the appearance of a finished product. It will be understood that the binding 14 may be chosen of any suitable material to correspond with the finish of the particular shoe or sandal. For example, if the upper of the shoe is gold-kid, the binding 14 would also be of gold color and preferably of the same upper leather. Alternatively, a different color may be used to give a desired ornamental effect. After the binding 14 and shank stiffener 13 have been positioned on the shank piece 12, the latter is tacked onto a last and the counter portion 15 of the sandal is tacked in place. The counter portion 15 comprises the side straps 16 and 17, which are tacked to the bottom surface of the shank piece 12 by tacks 18; the rear strap 19; and the counter strap 20, which terminates in the ankle strap 21 in the manner shown. In accordance with the preferred embodiment of this invention the counter portion is formed by sewing the separate straps together, but it is also feasible to cut out by a die the counter portion in the desired shape and size.

Figure 8:
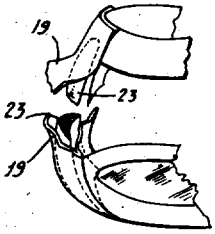

Upon reference to Fig. 8, the strap 19, it will be seen, contains a pocket 19a into which a counter or similar stiffener 23 is inserted. This last mentioned member serves the function of the usual counter in a shoe. The stiffener 23 is of the usual belly leather used in making counters, and is suitably shaped and skived to fit into the pocket 19a properly. The bottom edge of the stiffener extends over onto the heel surface of the shank member and tacks 19b (Fig. 4) are driven through the edge into the heel of the shank member, whereby to unite the two and at the same time furnish a support for the counter portion. Any suitable fastening means (not shown) may be used to join the ends of the ankle strap together, either in front of the ankle or at the side thereof.

Figure 1:
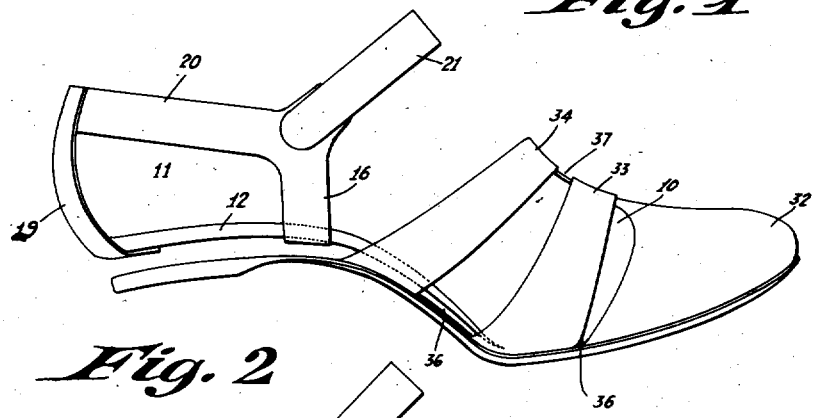
Fig. 1 is an exploded view of a sandal constructed in accordance with the principles of this invention.
Figure 5:
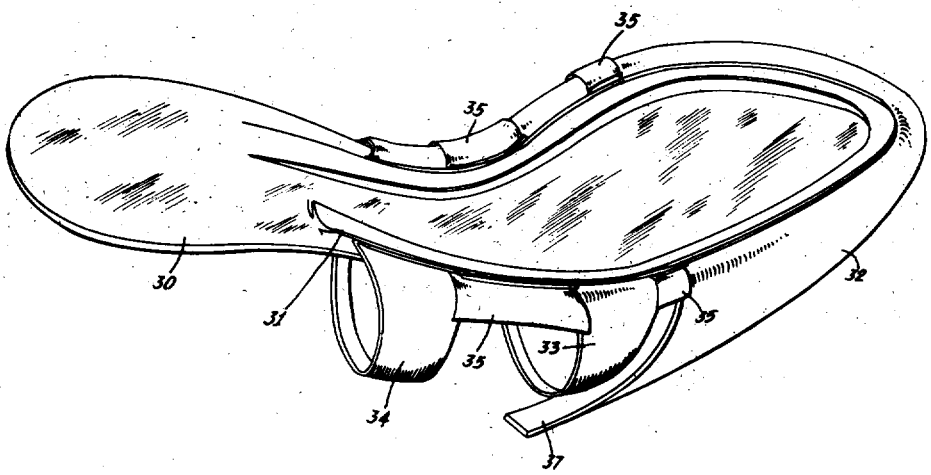
Figure 7:
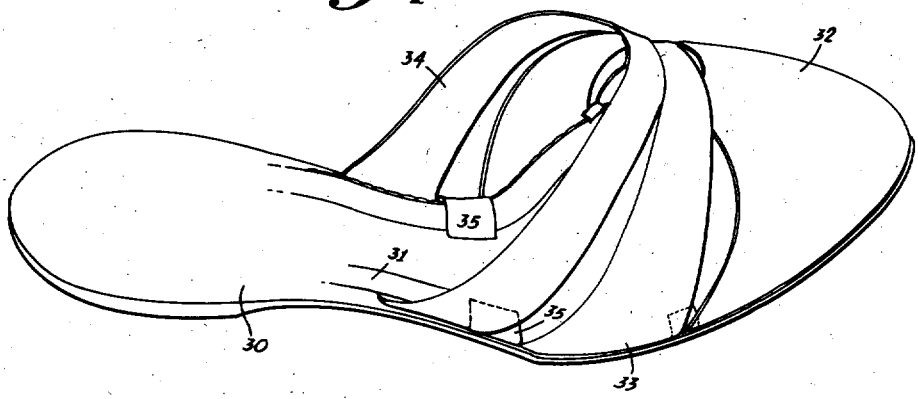

Having prepared the counter portion of the sandal or shoe, the forward portion, which includes the vamp and toe of the sandal, is now prepared as follows:

Referring in detail to Figs. 1, 5 and 7, the outsole 30 is first tacked onto a last with the tread surface of the sole in contact with the bottom of the last and the channeled surface of the sole outward. The forward portion, which comprises the vamp and toe, is lasted inside out and in this position is stitched to the lip 31 of the outsole 30. This operation is in accordance with the prior art practice of assembling turned shoes. Next, the surface of the outsole, including the lip 31, is trimmed to eliminate unevenness and the extra material resulting from the stitching operation. The last is then withdrawn and the forward portion, the outsole still being in temper, is turned rightside out. This gives a step product as shown in Fig. 7. The forward portion, it will be seen, comprises the toe portion 32 and the vamp straps 33 and 34. Additional binding strips 35 are sewed to the outsole as shown more specifically in Figs. 5 and 7, so that when the forward portion is turned and the shoe assembled the marginal edge portion of the top surface of the outsole is covered by these binder stips at the cut-out portions 36 (Fig. 1). It will be understood that the binder strips 35 may be of any suitable material to harmonize with the finished product in the same way as was described in connection with the binding 14. The toe portion 32 has a rearwardly extending strap 37 to which the side straps 33 and 34 are joined.

After the forward portion is turned as above described, the upper rear surface of the outsole from a point substantially at the ball line of the foot rearwardly to the heel is roughened and a celluloid cement applied thereto. Similarly, the bottom surface of the shank piece 12 is roughened and a corresponding coating of celluloid cement is applied thereto. The next operation involves the assembly of the two portions together, and before this operation is performed, a solvent is applied to the cemented portions to render the same tacky, the cement in the meantime having dried. Following this operation, the rear portion, which is still mounted on the last, is fitted together with the forward portion, which is not on a last, the last of the rear portion being used to fit into the forward portion, whereby the two are brought together on a single last. The thus assembled product is then placed in a machine having pneumatic pads and a rotatable table carrying the pads, in such a way that when the last is clamped in place the table rotates to a position where air is admitted into the interior of the pads thus applying pressure to the sole of the shoe. The table rotates to an unloading position where the air is released and the shoe removed. It will be understood that the time interval during which the assembled shoe is kept under pressure may be regulated by the speed of rotation of the table or by some other obvious means. Obviously, any type of machine having pneumatic pads may be used instead of the one having the rotatable table. There are many such machines commercially available and further detailed description is therefore unnecessary. Upon removing the assembled shoe from the press, the heel may now be attached and the shoe finished in accordance with the other well known methods now commonly used.

Figure 2:
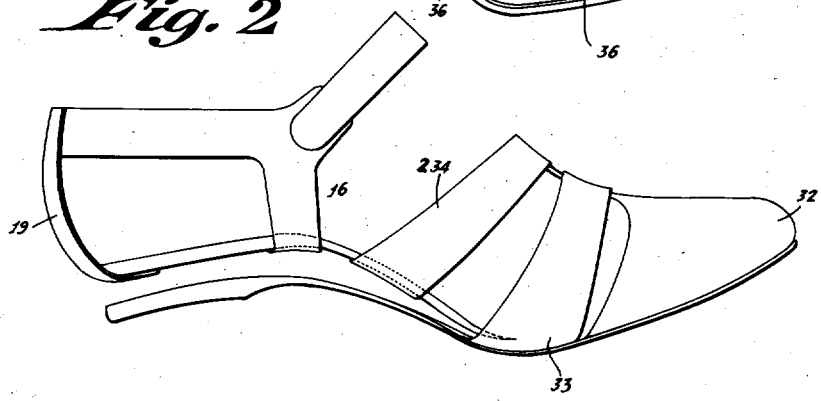
Fig. 2 is a similar view of a modified form of the invention.
Figure 6:
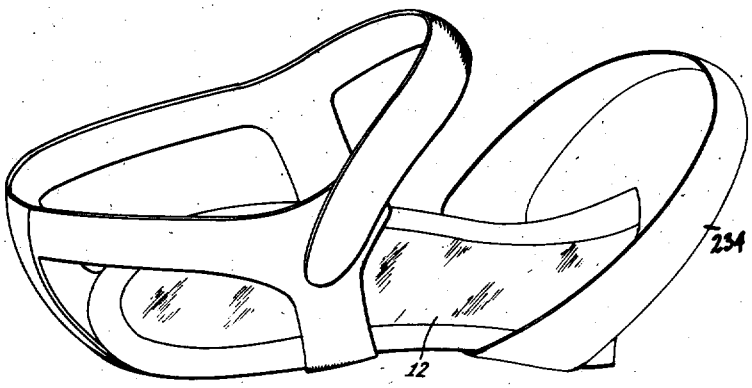

In accordance with a modification of the present invention, as illustrated more particularly in Figs. 2 and 6, the rear or counter portion is assembled to include, in addition to the side straps 16 and rear strap 19, one of the straps 234 which is attached to the shank piece 12, usually by tacks, in the same position that the strap 234 would take, were the shoe constructed in accordance with the modification of the invention illustrated in Fig. 1. The forward portion of this form of the invention is prepared in the same way as described in connection with Fig. 1, with the exception that this forward portion now only includes the toe portion 32 and the side strap 33. The remaining steps of the process of preparing this form of the invention are the same as those already described.

Figure 3:
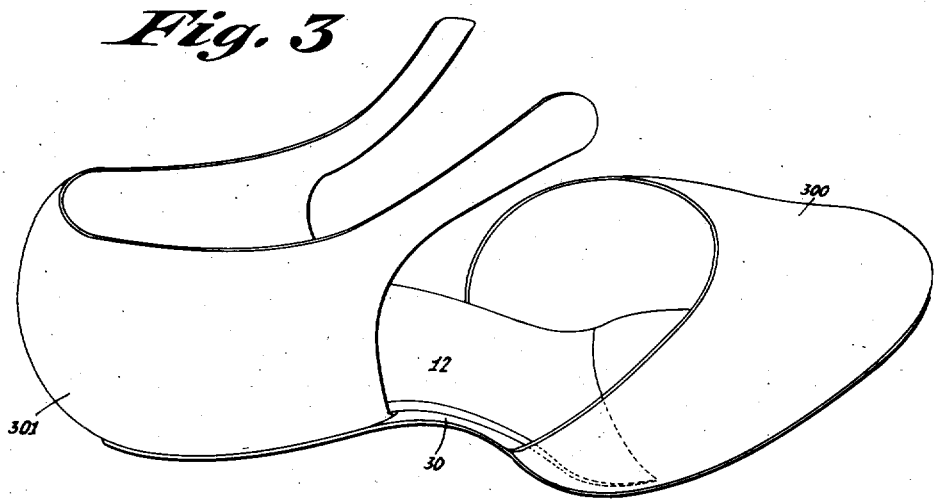
Fig. 3 is a perspective view of a further modification of the invention.

Referring now in detail to Fig. 3, the present invention is shown applied to an ordinary slipper of the open shank type in which a unitary vamp 300 is assembled on the outer sole 30 in accordance with the standard practice of a turned shoe process. Similarly, the rear or counter portion 301 is assembled with the shank piece 12 in a manner similar to that described in connection with Fig. 4, but differing therefrom in that the portion 301 is of a unitary structure as distinguished from the strap members shown in Fig. 4. In this form of the invention the usual counter may be used and it is held in place on the shank member 12 by tacks passing through the edge which folds over onto the heel surface of the piece 12. Following the preparation of these separate portions, the two are assembled in accordance with the method described above.

Many changes in the foregoing specific embodiments of this invention will readily suggest themselves to those skilled in the art without departing from the spirit of this invention, whose scope is not to be limited except as defined in the hereto-annexed claims.

For example the particular sequence of the operation in the foregoing process may be varied. From a practical point of view the forward and rear parts may be prepared simultaneously or they may be prepared one before the other, depending upon which is most convenient and time saving. Also, it may be found desirable to use a single last, for the first lasting, second lasting, and assembly of the rear section. All of these expediences are within the skill and good judgment of one skilled in the art.

Having thus described our invention, we claim:

1. The method of making shoes which comprises assembling shank and counter portions including exposed upper material on a first last, assembling a forward portion including an outsole and vamp including the exposed upper material on a second last, withdrawing the second last, turning said forward portion, and joining said first mentioned portions and said forward portions together.

2. The method of making shoes which comprises assembling a rear section including exposed upper material on a first last, assembling a forward section including an outsole and vamp on a second last, withdrawing the second last, turning said forward section, and joining said first mentioned section and said forward section together.

3. The method of making shoes which comprises assembling a rear section including exposed upper material on a first last, assembling a forward section on a second last, withdrawing the last mentioned last, turning the forward section, and cementing the rear and forward sections together.

4. The method of making shoes which comprises in combination the steps of tacking a shank piece onto a first last, tacking a counter portion including exposed upper material onto said shank piece, lasting a vamp and toe portion on a separate last, turning said last mentioned portion, inserting the said first last into said turned portion and uniting said portions.

5. The method of making shoes which comprises in combination the steps of tacking a shank piece onto a first last, tacking a counter portion of the shoe onto said shank piece, lasting an outsole and a vamp and toe portion of the shoe on a separate last, turning said outsole and last mentioned portion, inserting the said first last into said turned portion, and cementing said shank and counter portions to the outsole.

6. The method of making shoes which comprises lasting a rear section of a shoe including exposed upper material right-side out, lasting a forward section of the shoe including exposed upper material wrong-side out, turning said forward section, and then joining said two sections together.

CHARLES MILLER.
ALBERT LEONE.